United States Patent [19]

Cole

[11] 4,222,340
[45] Sep. 16, 1980

[54] CABLE DEPTH CONTROL APPARATUS
[75] Inventor: Jimmy R. Cole, Houston, Tex.
[73] Assignee: Syntron, Inc., Houston, Tex.
[21] Appl. No.: 956,731
[22] Filed: Nov. 1, 1978
[51] Int. Cl.$^2$ .................. B63G 8/00; B63B 21/00
[52] U.S. Cl. .................. 114/245; 114/332; 367/16
[58] Field of Search ............. 114/244, 245, 121, 126, 114/330, 331, 332; 340/7 PC

[56] References Cited
U.S. PATENT DOCUMENTS

| | | | |
|---|---|---|---|
| 3,375,800 | 4/1968 | Cole | 114/245 |
| 3,434,446 | 3/1969 | Cole | 114/245 |
| 3,931,608 | 1/1976 | Cole | 114/245 |
| 4,027,616 | 6/1977 | Guenther | 114/244 |

Primary Examiner—Trygve M. Blix
Assistant Examiner—D. W. Keen
Attorney, Agent, or Firm—Pravel, Gambrell, Hewitt, Kirk, Kimball & Dodge

[57] ABSTRACT

An apparatus to control the depth in the water of a marine cable, such as a streamer of seismic geophones or hydrophones towed behind an exploration boat during seismic surveys of submerged formations, and maintain the cable at a desired depth. The apparatus includes structure to prevent damage from obstacles in the water and other imparing of performance. The apparatus includes other structure to improve performance characteristics in operation.

10 Claims, 4 Drawing Figures

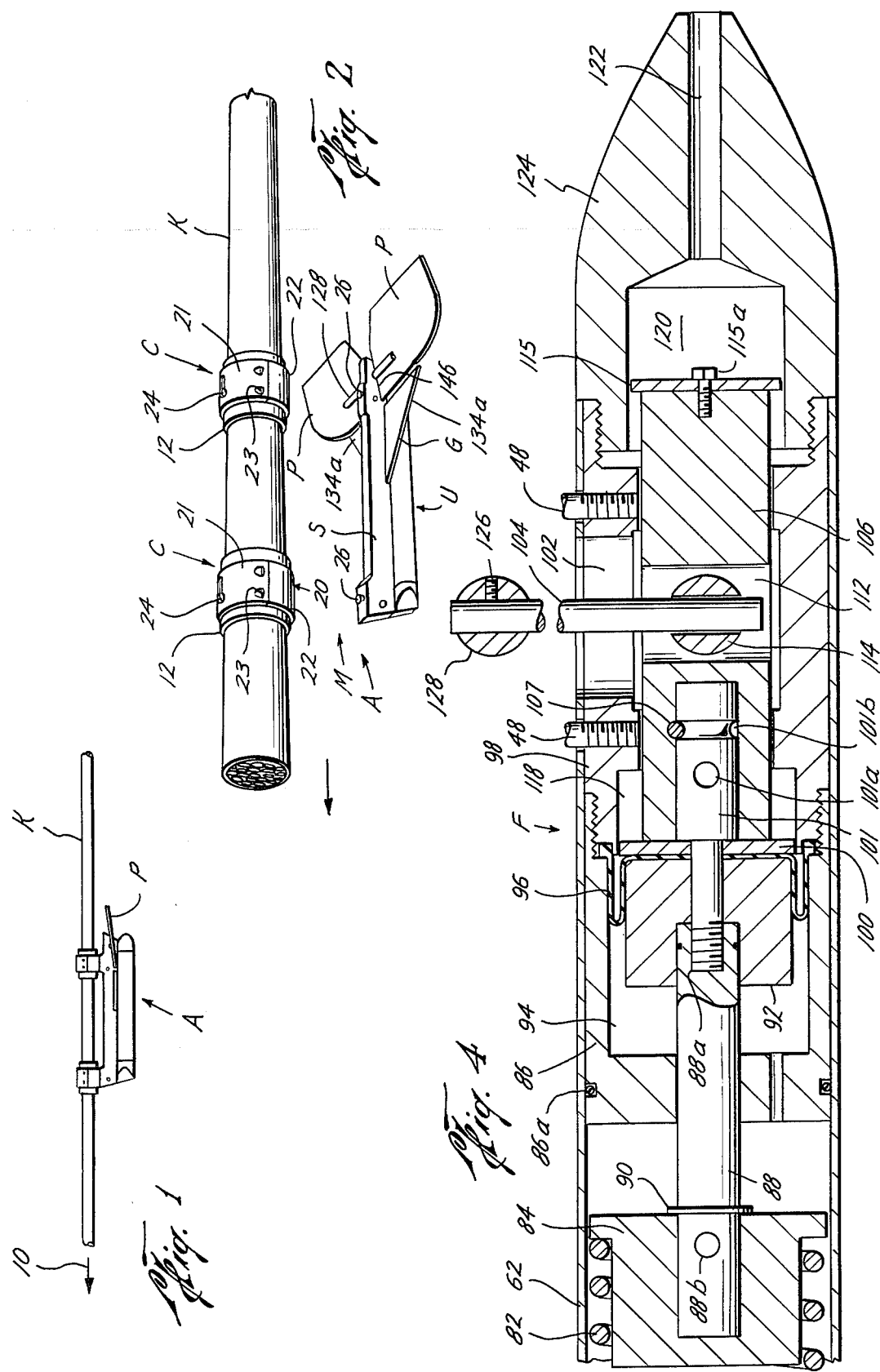

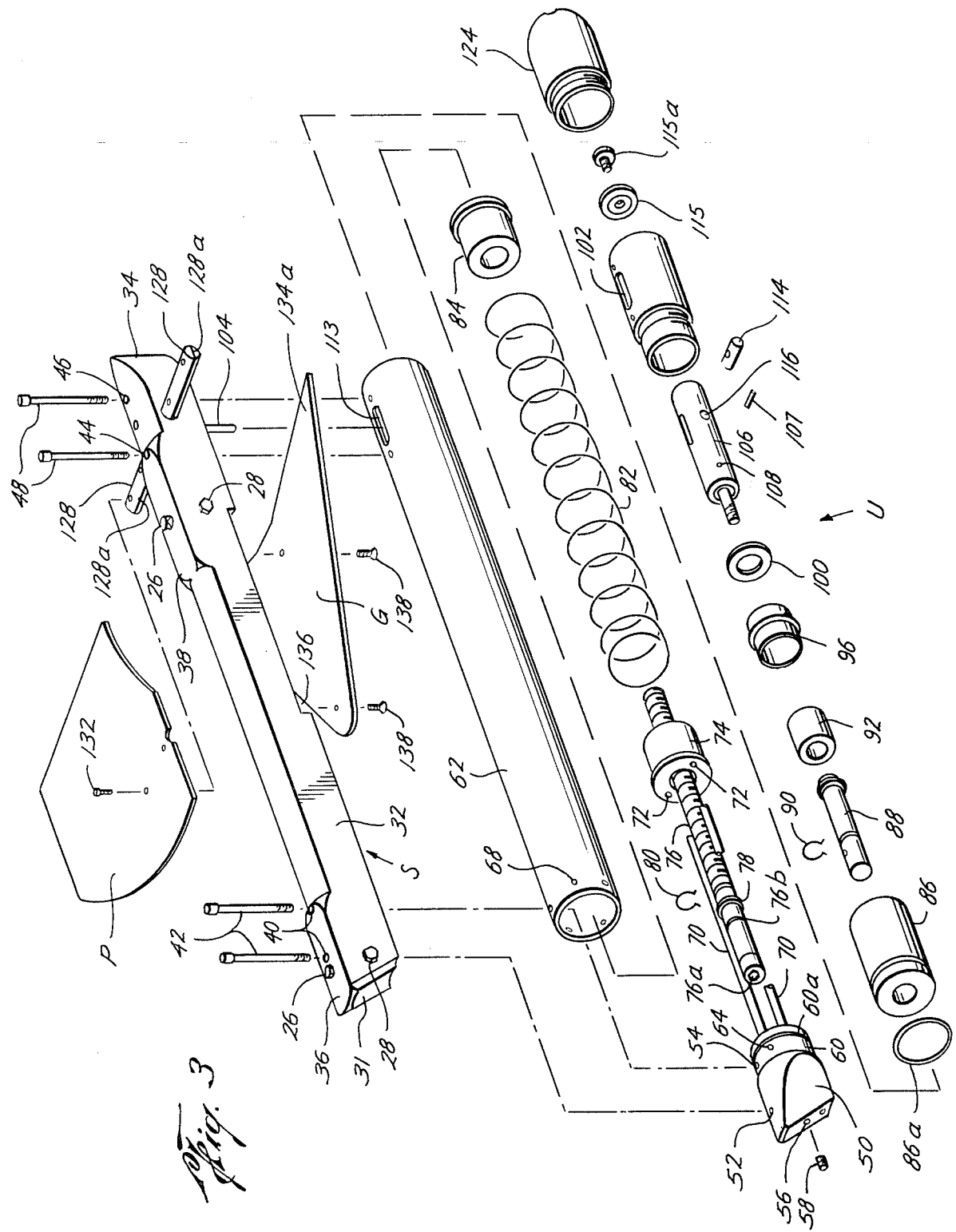

CABLE DEPTH CONTROL APPARATUS

BACKGROUND OF INVENTION

1. Field of Invention

The present invention relates to apparatus for controlling the depth of marine cables.

2. Description of Prior Art

U.S. Pat. No. 3,931,608, of which applicant is inventor, was an apparatus for controlling the depth of a marine cable, such as a geophysical exploration cable during marine seismic exploration. The apparatus of this patent departed from other depth controllers, such as in U.S. Pat. Nos. 3,375,800 and 3,434,446 of which applicant is also an inventor, by moving the housing which contained the depth controlling mechanism from a position enclosing the seismic cable to a position spaced from the cable by a support shank so as to reduce noise induced into the cable and improve performance.

The depth controller apparatus of U.S. Pat. No. 3,931,608 included a prow member adapted to deflect marine growth and debris away from the depth controlling diving planes as the depth controller was towed with the seismic cable through the water. However, often seismic exploration is performed in areas where buoys and other floating objects as well as fishing lines and traps are deployed in the water. These types of objects are often suspended in the water by wire or metal lines or cables. When a seismic exploration passed near these types of objects, the line often contacted the diving control wings or planes of the depth controller, damaging the depth controller.

Attempts have been made, as in U.S. Pat. No. 4,027,616, to protect the depth control vanes of cable depth controllers of one particular design in a cage or mask-like enclosure. However, this type of protection device was mounted, along with the depth control vanes, along the longitudinal axis of the seismic cable and thus did not, so far as is known, permit relative movement of the depth controller with respect to the cable when a line was encountered.

SUMMARY OF INVENTION

Briefly, the present invention provides a new and improved depth control apparatus for a seismic cable. A spring, held in compression between front and aft spring inserts, exerts a force corresponding to that of water pressure acting on a piston at a desired operating depth for the cable. A piston member, contained with the opening in a control body which is mounted to the cable at a spaced position therefrom, responds to ambient water pressure and exerts a force against the spring. Diving planes, connected to the piston by a moment arm, cause the apparatus and portions of the cable attached thereto to move to the desired operating depth. An adjusting screw is mounted to one of the spring inserts for adjustment of the compressive force of the spring to adjust and control the operating depth of the cable.

In another aspect, the present invention provides cable depth control apparatus less likely to entangle with or become damaged by debris and the like during towing of the cable through a body of water.

BRIEF DESCRIPTION OF THE DRAWINGS

FIG. 1 is an elevation view of an apparatus of the present invention mounted with a cable;

FIG. 2 is an isometric view, partially exploded, of the apparatus and cable of FIG. 1;

FIG. 3 is an exploded isometric view of the apparatus of FIGS. 1 and 2; and

FIG. 4 is a cross-sectional view of a portion of the apparatus of FIGS. 1-3.

DESCRIPTION OF PREFERRED EMBODIMENT

In the drawings, the letter A designates generally the apparatus of the present invention for controlling the depth of a seismic cable K of the conventional type, formed from vinyl or other suitable material, as the cable K is towed or pulled forward through a body of water in a direction indicated by an arrow 10 (FIG. 1) along its longitudinal axis behind a seismic exploration vessel of the conventional type. As is typical, the cable K is filled with kerosene or suitable liquid for neutral buoyancy in the body of water and contains at spaced locations therein plural seismic signal sensing geophones or hydrophones which detect seismic signals reflected from geological features underlying the body of water being explored. The sensing hydrophones are connected through suitable conductors in the cable K to the vessel to permit the response of these geological features to be recorded by suitable instruments on the vessel.

Typically, the cable K is several thousand feet in length, and plural depth control apparatus A of the present invention are mounted at suitably spaced locations along the cable K to keep the cable K at substantially the same depth along its length, an important factor for accuracy in seismic surveying.

The apparatus A includes a depth control unit or assembly U, which includes therein a force comparator F (FIG. 4) which compares the force of ambient water pressure acting on a piston at the depth at which the cable is operating with a reference force representing the desired cable depth, unit U, and diving planes P (FIGS. 1-3) which respond to the comparator F and move the cable K to the desired depth.

A connector means M mounts the depth control unit U to the cable K and includes a support shank S mounted between the control body U and the cable K. The support shank S further has the diving planes P mounted therewith and extending sidewardly therefrom transversely to the longitudinal axis of the cable K. The connector means M further includes plural connecting collar assemblies C for attaching the support shank S to the cable K. The connecting collar assemblies may be, for example, of the type described in U.S. Pat. No. 3,931,608.

Considering the apparatus A more in detail, the connecting collar assemblies C (FIG. 2) each include a plurality of cylindrical inner races 12 mounted at desired positions with the cable K spaced from each other. The inner races 12 are preferably formed of two half cylinder members which are semi-circular in cross-section, clamped around the streamer, and mounted to each other by screws or other suitable attaching means.

The center section of the inner races 12 is adapted to receive an outer race or locking collar 20. The locking collar 20 is preferably formed of two half-cylinder members 21 and 22 which are semi-circular in cross-section and mounted to each other by screws 23 or other suitable attaching means. The locking collar 20 is freely rotatably movable with respect to the inner race 12.

Each locking collar 20 has a locking slot 24 formed therein so that a locking pin 26 (FIG. 3) of the support shank S may be mounted therewith to mount the support shank S with the cable K. The locking slot 24 is shown atop the cable K in the drawing, although when the depth control unit U and support shank S are attached thereto, the slot 24 is beneath the cable K due to the weight of the attached structure.

The locking pins 26 are preferably of the type set forth in co-pending U.S. patent application Ser. No. 956,730, filed on Nov. 1, 1978.

A cam 28 is mounted with the support shank S adjacent each locking pin 26 to secure the support shank S to the connecting collars C. The cam 28 is rotatably movable with respect to the support shank S to selectively engage and disengage a Belleville washer spring assembly in the manner disclosed in the aforementioned co-pending U.S. patent application to firmly engage the depth control unit U to the locking collar 20 and cable K.

The support shank S includes a downwardly sloping nose portion 31 (FIG. 3) extending rearwardly therefrom along a body portion 32 to a tapered tail portion 34. The support shank S extends the length of the depth control unit U, for reasons to be set forth below.

The support shank S further includes a front mounting shoulder 36 extending upwardly from the body portion 32 rearwardly from the nose portion 31 and a rear mounting shoulder 38 extending upwardly from body portion 32 forward of the tail portion 34. Each of the mounting shoulders 36 and 38 has openings formed therein for receipt of the locking pin 26 and cam unit 28 and related structure, as disclosed in the aforementioned co-pending U.S. patent application.

A plurality of vertical openings 40 are formed in the front mounting shoulder 36 for passage therethrough of connector screws 42 to connect forward portions of the control body C to the support shank S. An opening 44 is formed in the rear mounting shoulder 38 and an opening 46 is formed in the tail portion 34 of support shank S for insertion of connector screws 48 to connect rear portions of the control body C to the support shank S.

The control body C has a front nose piece 50 shaped in the form of a prow-like member and having sockets 52 and 54 for receipt of the connector screws 42. A longitudinal passage 56 is formed extending through the nose piece 50 and has a set screw 58 mounted therein. The screw 58 is removable so that the depth setting of the apparatus A may be adjusted, as will be set forth.

The nose piece 50 has a reduced diameter rear portion 60 for receiving a front portion of a tubular housing member 62. The rear portion 60 has the socket 54 for receipt of the connector screw 42 and suitable sockets 64 for receipt of mounting screws which pass through suitable openings 68 in the housing member 62 to connect same to the nose piece 50. An O-ring 60a is mounted to the rear portion 60 of the nose piece 50 for sealing the front portion of the housing member 62.

A plurality of guide rods 70 extend rearwardly from the nose piece 60 into suitable openings 72 of a forward spacing insert member 74 to restrain the insert member 74 against rotational movement. The insert member 74 has a threaded central opening therein for passage of a depth adjusting screw 76. A socket 76a is formed on a front end of the adjusting screw 76 and is accessible through the passage 56 to permit the position of insert 74 to be adjusted as will be set forth. An O-ring 76b is mounted with the adjusting screw 76 to seal the passage 56. The adjusting screw 76 engages the insert member 74 and causes relative longitudinal movement thereof in response to rotational movement of the screw 76. A snap ring 80 is mounted on the screw 76 to hold the thrust washer 78 in place on the screw 76. The combination of the washer 78 and snap ring 80 thus prevents relative longitudinal movement between the screw 76 and nose piece 50.

A spring 82 is mounted between the forward spring insert 74 and a rear or aft spring insert 84 within the housing member 62. The spring 82 is maintained under a selected amount of compressive force between the spring inserts 74 and 84 representing ambient water pressure acting on the area of the piston at the desired operating depth of the apparatus A. The amount of force on the spring 82 may be varied or adjusted by means of the depth adjusting screw 76.

A piston rod extension 88 (FIGS. 3&4) extends through a central opening in the cylinder 86 and the aft spring insert 84 and receives a snap ring 90 for transmitting the desired forces from the spring 82 to the force comparator F. The piston rod extension 88 has an internal thread 88a (FIG. 4) at a rear end portion for connection with a piston 92 in a manner to be set forth.

The piston 92 fits within a hollow rear portion 94 of the cylinder 86. A diaphragm 96 is mounted between the cylinder 86 and a piston rod bearing 98 to seal the portion 94 of the cylinder 86. A seal washer 100 mounts the diaphragm 96 to the piston 92 and is held in position along with the piston 92 on the piston rod 88 by a piston rod assembly 105 which is threaded along a front portion to engage and mount with similar threads on the piston rod extension 88 (FIG. 4). An opening 88b is formed in the rod 88 and an opening 101a is formed in the rod 101 so they may be separated using inserted chucks or the like. An O-ring 86a is mounted on the cylinder 86 for sealing the rear portion of the housing 62.

The piston rod 106 is mounted to the piston rod 101 to form the piston rod assembly 105 by means of a lock pin 107 inserted through a opening 108 in the rod 106. The lock pin 107 rides in an annular groove 101b formed about the rod 101 so that the piston rods 101 and 106 are relatively rotatable, permitting the slot 112 in rod 106 to be rotated into alignment with the slot 102 in the bearing 98.

The piston rod bearing 98 has suitable threaded sockets formed therein (FIG. 4) for receipt of the connector screws 48 which pass through suitable openings in rear portions of the housing 62, which encloses the bearing 98 therein. A longitudinal slot or passage 102 is formed in the bearing 98 for passage therethrough of a moment arm 104 mounted with a piston rod 106. The piston rod 106 has a vertically extending slot 112 adjacent a similar slot 113 in the housing 62 for receipt of a lower end of the moment arm 104. Moment arm 104 is mounted in a bushing 114 which is mounted in a transverse port or passage 116 formed in piston rod 106 adjacent the slot 112 for relative rotational movement along with the piston rod 106.

A limit washer 115 is mounted by a screw 115a to a rear portion of piston rod 106 to contact the bearing 98 and limit forward movement of the piston 92 in response to sudden changes downwardly in the depth of the cable K.

The piston rod 106 is mounted in an internal chamber or cavity 118 of the bearing 98. The chamber 118 and diaphragm 96 are subjected to ambient fluid pressure through a chamber 120 and rearwardly extending passage 122 formed in a tail piece 124. The tail piece 124 is mounted with a threaded front portion thereof engaging similar threaded portions of the bearing 98.

The passage 122 permits a pressure sensing instrument to be inserted into contact with the piston rod 106 so that the pressure exerted thereon by the spring 82 may be sensed with the diving planes P in a level position to calibrate the depth setting of the apparatus A.

The moment arm 104 is mounted by a set screw 126 to a diving plane shaft 128 which extends outwardly on each side of the support shank S to receive the diving planes P. The diving planes 130 are inserted into slots 128a formed in the diving plane shafts 128 and are mounted thereto by screws 132 or other suitable means.

The moment arm 104 translates relative movement of the piston 92 within the cylinder 86 and piston rod bearing 98, in response to ambient water pressure and the force of the spring 92 in the force comparator F, into rotational movement of the diving plane shafts 128 and diving planes 130 in order to control the depth of the apparatus A and the cable attached thereto to a desired, predetermined depth. If the cable K goes below the desired depth, water pressure on piston 92 exceeds the force of spring 82 and the diving planes P tilt upwardly so that the apparatus A adjusts the cable depth upwardly. If the cable K is above desired operating depth, the force in piston spring 82 exceeds the force of ambient water pressure on the piston 92 and the diving planes P tilt down to lower the cable K in the water.

A generally delta-shaped flat diving plane guard member 134 is mounted in a lower socket 136 formed in the support shank S and is held in place by means of screws 138 or other suitable means. The diving plane guard 134 is mounted ahead of the diving planes P (FIG. 2) in the direction of longitudinal movement of the cable K and tapers outwardly from a leading portion to wing portions 134a. Further, the diving plane guard 134 is mounted substantially below the longitudinal axis of the cable K, being spaced therefrom by the thickness of the support shank S. In this manner, in the event that the seismic cable K and apparatus A encounter an obstacle or obstruction while being towed through a body of water, the spacing of the diving plane from the center-line axis of the cable provides a way for the apparatus A to rotate away from the passing obstruction, with less likelihood of damage to the apparatus A. Further, the wings of the diving plane guard 134 deflect debris and obstruction away from junctions 140 (FIG. 2) formed between the diving planes P and the support shank S to prevent clogging or jamming the diving planes P against movement.

The foregoing disclosure and description of the invention are illustrative and explanatory thereof, and various changes in the size, shape and materials as well as the details of the illustrated construction may be made without departing from the spirit of the invention.

I claim:

1. A depth control apparatus for a seismic cable or the like, comprising:
   (a) spring means for exerting a force corresponding to that of water pressure at a desired operating depth for the cable;
   (b) piston means responding to ambient water pressure for exerting a force against said spring means;
   (c) a control body member for enclosing said spring means and said piston means, said control body member being mounted to said cable at a spaced position therefrom;
   (d) diving plane means for causing said apparatus and the cable to move to the desired operating depth;
   (e) moment arm means interconnecting said piston means and said diving plane means;
   (f) front and aft spring insert means mounted in said control body member for exerting a force on said spring means;
   (g) an adjusting screw mounted with said front spring insert means in said control body member for adjusting the relative position of said front spring insert means with respect to said rear insert means to control the amount of force on said spring means; and
   (h) a plurality of guide rods mounted in said control body member for restraining said front spring insert means against relative rotational movement during adjusting of the position thereof by said adjusting screw.

2. The structure of claim 1, further including;
   (a) a piston rod mounted in said control body member for longitudinal movement therein responsive to said piston means;
   (b) a moment arm bushing mounted in said piston rod for receiving said moment arm means therein, said moment arm being rotatably movable with respect to said piston rod.

3. The structure of claim 1, further including;
   a nose piece formed at a front end of said control body member.

4. The structure of claim 3, further including;
   (a) an adjustment opening formed in said nose piece for access to said adjusting screw; and
   (b) means for closing said adjustment opening.

5. The structure of claim 1, further including;
   a tail piece formed at a rear end of said control body member.

6. The structure of claim 5, further including:
   a passage formed in said tail piece extending rearwardly therethrough for insertion of a pressure sensing instrument.

7. The structure of claim 1, further including:
   (a) a support shank member for mounting said control body member to the cable at a spaced position therefrom;
   (b) said support shank member having said diving plane means mounted therewith;
   (c) diving plane guard means mounted between said support shank and said control body member forward of said diving plane means for deflecting debris and the like away therefrom.

8. The apparatus of claim 7, wherein said diving plane guard means tapers from a leading portion outwardly to wing portions for deflecting debris away from said diving plane means.

9. The apparatus of claim 7, wherein he seismic cable has a center line along a longitudinal axis and said diving plane guard is mounted below said support shank and the center line of the seismic cable.

10. A depth control apparatus for a seismic cable or the like, comprising:
    (a) spring means for exerting a force corresponding to that of water pressure at a desired operating depth for the cable;
    (b) piston means responding to ambient water pressure for exerting a force against said spring means;
    (c) a control body member for enclosing said spring means and said piston means, said control body member being mounted to said cable at a spaced position therefrom;
(d) diving plane means for causing said apparatus and the cable to move to the desired operating depth;
(e) moment arm means interconnecting said piston means and said diving plane means;
(f) front and aft spring insert means mounted in said control body member for exerting a force on said spring means;
(g) an adjusting screw mounted with said front spring insert means in said control body member for adjusting the relative position of said front spring insert means with respect to said rear insert means to control the amount of force on said spring means;
(h) a nose piece formed at a front end of said control body member;
(i) an adjustment opening formed in said nose piece for access to said adjusting screw; and
(j) means for closing said adjustment opening.

* * * * *